(12) United States Patent
Sood et al.

(10) Patent No.: US 11,609,122 B1
(45) Date of Patent: Mar. 21, 2023

(54) SILICON NITRIDE-CARBON NANOTUBE-GRAPHENE NANOCOMPOSITE MICROBOLOMETER IR DETECTOR

(71) Applicant: Magnolia Optical Technologies, Inc., Woburn, MA (US)

(72) Inventors: Ashok K. Sood, Brookline, MA (US); Elwood J. Egerton, Hot Springs, SD (US)

(73) Assignee: Magnolia Optical Technologies, Inc., Woburn, MA (US)

( * ) Notice: Subject to any disclaimer, the term of this patent is extended or adjusted under 35 U.S.C. 154(b) by 0 days.

(21) Appl. No.: 17/234,355

(22) Filed: Apr. 19, 2021

Related U.S. Application Data

(63) Continuation of application No. 16/424,440, filed on May 28, 2019, now Pat. No. 10,983,010, which is a
(Continued)

(51) Int. Cl.
*G01J 5/02* (2022.01)
*G01J 5/10* (2006.01)
(Continued)

(52) U.S. Cl.
CPC .................. *G01J 5/10* (2013.01); *G01J 5/023* (2013.01); *G01J 5/024* (2013.01); *G01J 5/046* (2013.01); *G01J 5/20* (2013.01)

(58) Field of Classification Search
CPC .... G01J 5/10; G01J 5/023; G01J 5/024; G01J 5/046; G01J 5/20
See application file for complete search history.

(56) References Cited

U.S. PATENT DOCUMENTS 6,400,088 B1  6/2002  Livingston
8,110,883 B2 *  2/2012  Ward .................. G01J 5/02
                                             257/467
(Continued)

OTHER PUBLICATIONS

Itkis, et al., "Bolometric Infrared Photoresponse of Suspended Single-Walled Carbon Nanotube Films", "Science Magazine", Apr. 21, 2006, pp. 413-416, vol. 312, Publisher: Science, Published in: US.
(Continued)

*Primary Examiner* — Marcus H Taningco
(74) *Attorney, Agent, or Firm* — Loginov & Associates, PLLC; William A. Loginov

(57) ABSTRACT

The present disclosure is a infrared sensor capable of being integrated into a IR focal plane array. It includes of a CMOS based readout circuit with preamplification, noise filtering, and row/column address control. Using either a microbolometer device structure with either a thermal sensing element of vanadium oxide or amorphous silicon, a nanocomposite is fabricated on top of either of these materials comprising aligned or unaligned carbon nanotube films with IR trans missive layer of silicon nitride followed by one to five monolayers of graphene. These layers are connected in series minimizing the noise sources and enhancing the NEDT of each film. The resulting IR sensor is capable of NEDT of less than 1 mK. The wavelength response is from 2 to 12 microns. The approach is low cost using a process that takes advantage of the economies of scale of wafer level CMOS.

6 Claims, 8 Drawing Sheets

Related U.S. Application Data continuation of application No. 15/853,672, filed on Dec. 22, 2017, now Pat. No. 10,302,498, which is a continuation of application No. 15/393,211, filed on Dec. 28, 2016, now Pat. No. 9,851,257.

(60) Provisional application No. 62/272,009, filed on Dec. 28, 2015.

(51) Int. Cl.
*G01J 5/20* (2006.01)
*G01J 5/04* (2006.01)

(56) References Cited

U.S. PATENT DOCUMENTS

| | | | | |
|---|---|---|---|---|
| 9,196,766 | B1* | 11/2015 | Egerton | G01J 5/0853 |
| 9,677,946 | B1* | 6/2017 | Egerton | G01J 5/0853 |
| 9,851,257 | B1* | 12/2017 | Sood | G01J 5/024 |
| 9,945,720 | B1* | 4/2018 | Egerton | H01L 31/095 |
| 10,302,498 | B1 | 5/2019 | Sood | |
| 2006/0289996 | A1* | 12/2006 | Ono | H01L 27/101 |
| | | | | 257/E27.071 |
| 2010/0025660 | A1* | 2/2010 | Jain | B82Y 10/00 |
| | | | | 257/253 |
| 2011/0315981 | A1* | 12/2011 | Xu | G01J 5/046 |
| | | | | 438/54 |
| 2012/0098028 | A1* | 4/2012 | Naito | H01L 51/426 |
| | | | | 438/57 |
| 2014/0345843 | A1* | 11/2014 | Kirkor | H05K 7/2039 |
| | | | | 165/185 |
| 2015/0076373 | A1* | 3/2015 | Chow | G01J 5/53 |
| | | | | 250/504 R |
| 2016/0065169 | A1* | 3/2016 | Rinaldi | H01L 41/1873 |
| | | | | 29/25.35 |
| 2017/0084761 | A1* | 3/2017 | Cho | H01L 31/1126 |

OTHER PUBLICATIONS

Purewal, et al., "Scaling of Resistance and Electron Mean Free Path of Single-Walled Carbon Nanotubes", "Physical Review Letters", May 4, 2007, pp. 186808-1-186808-4, vol. 98, Publisher: The American Physical Society, Published in: US.

Du et al., "Approaching Ballistic Transport in Suspended Graphene", "Nature Nanotechnology", Jul. 20, 2008, pp. 1-5, vol. 3, No. 8, Publisher: Macmillan Publisher Limited, Published in: USA.

Calizo et al., "Temperature Dependence of the Raman Spectra of Graphene and Graphene Multilayers", "Nano Letters", Aug. 25, 2007, pp. 2654-2649, vol. 7, No. 9, Publisher: American Chemical Society, Published in: USA.

* cited by examiner

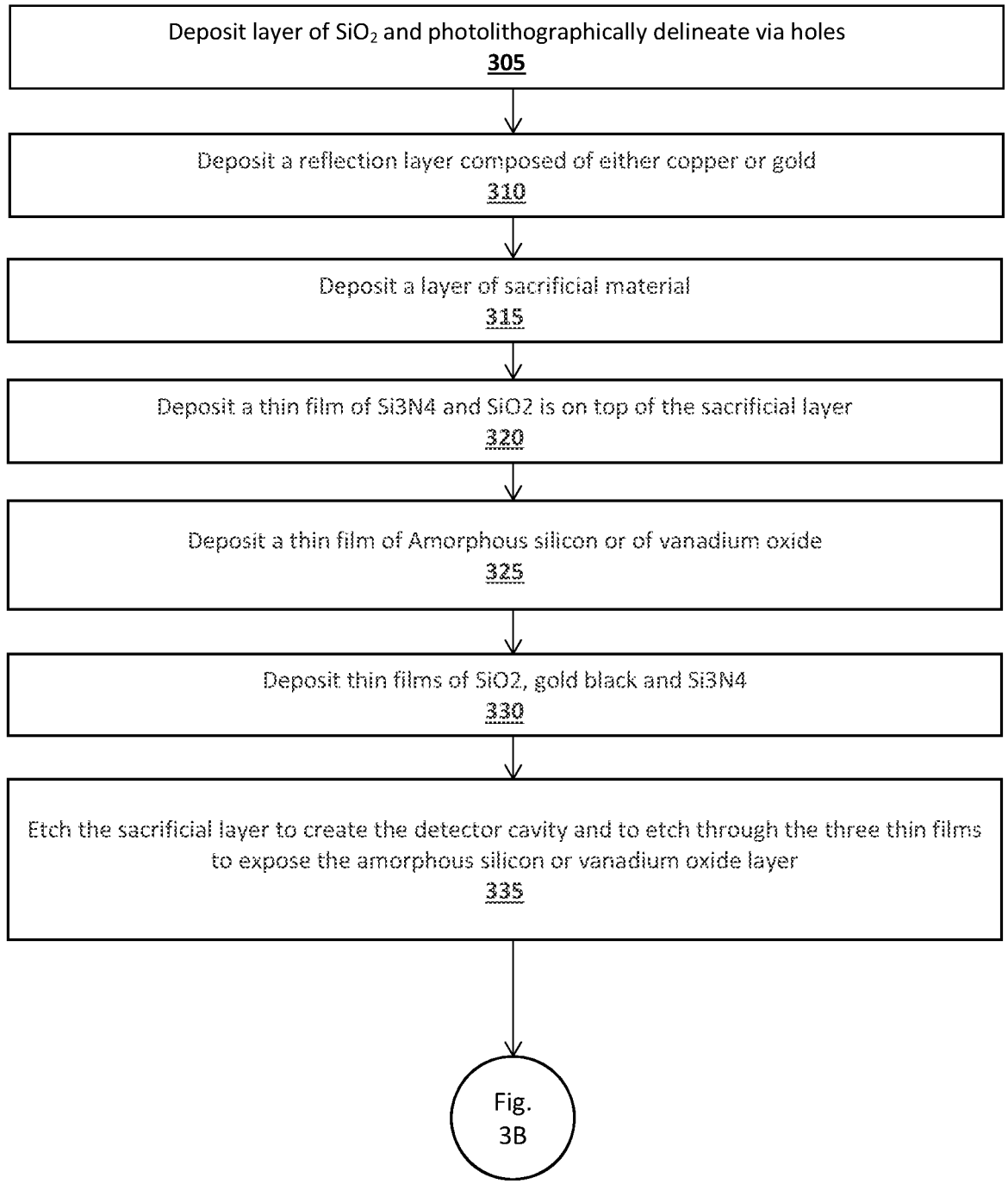

SILICON NITRIDE-CARBON NANOTUBE-GRAPHENE NANOCOMPOSITE MICROBOLOMETER IR DETECTOR

RELATED APPLICATIONS

The present application claims priority to U.S. Provisional application Ser. No. 62/272,009, filed Dec. 28, 2015, entitled SILICON NITRIDE-CARBON NANOTUBE-GRAPHENE NANOCOMPOSITE MICROBOLOMETER IR DETECTOR, the entire disclosure of which is incorporated by reference.

FIELD OF THE INVENTION

The present invention relates to a thermal IR detector by using silicon nitride-carbon nanotube-graphene nanocomposites fabricated on vanadium oxide or amorphous silicon microbolometric structures and methods of fabricating the same.

BACKGROUND OF THE INVENTION

Photodetectors are an integral part of optical circuits and components (for example emitters, modulators, repeaters, waveguides or fibers, reflectors, resonators, detectors, IR Focal plane arrays, etc.) and are used for the sensing of electromagnetic radiation. There are several approaches to these devices. Photoconducting materials, typically semiconductors, have electrical properties that vary when exposed to electromagnetic radiation (i.e. light). One type of photoconductivity arises from the generation of mobile carriers (electrons or holes) during absorption of photons. For semiconducting materials, the absorption of a specific wavelength of light, hence photon energy, is directly proportional to the band gap of the material ($Eg=hn=hc/l$, where Eg is the materials band gap, h is Plank's constant ($4.136 \times 10\text{-}15$ eVs), c is the speed of light in a vacuum ($2.998 \times 10^{10}$ cm/s) and l is the wavelength of the radiation). If the band gap energy is measured in eV (electron Volts) and the wavelength in micrometers, the above equation reduces to $Eg=1.24/l$. A photodiode (i.e. p-n diode, p-i-n photodiode, avalanche photodiode, etc.) is the most commonly employed type of photoconductor.

Light detection is ideally suited for direct band gap semiconductors such as Ge, GaAs, etc.; however, indirect band gap semiconductors (where an additional phonon energy is required to excite an electron from the valence band to the conduction band), such as silicon, are also used as photodetectors. Probably the most widely known type of photodetector is the solar cell, which uses a simple p-n diode or Schottky barrier to detect impinging photons. Besides silicon, most photodetectors do not integrate with current microelectronics technology, usually detect only a specific wavelength (i.e. 1.1 mm for Si, 0.87 mm for GaAs, 0.414 mm for a-SiC and 1.89 mm for Ge), and require multiple detectors to detect a broad band of wavelengths (hence photon energy).

There are other types of photodetectors that do not rely on the generation of current through the excitation of electrons (or holes). One such type of detector is the bolometer. Bolometers operate by absorbing radiation, which in turn raises the temperature of the material and hence alters the resistance of the material. Bolometers can be constructed from either metallic, metallic-oxides or semiconducting materials such as vanadium oxide, amorphous silicon. Since bolometers detect a broad range of radiation above a few microns, bolometers are typically thermally stabilized to reduce the possibility of detection of blackbody radiation that is emitted from the detector material, which leads to a high background noise. IR microbolometer detectors and arrays don't require cooling to cryogenic temperatures unlike the other detector technologies discussed. Another type of non-photo-generated detector is the pyroelectric detector. Pyroelectric detectors operate by sensing induced surface charges that are related to changes in the internal dipole moment generated from temperature shifts in the material.

It is possible for IR and visible light to be detected from individual single-walled graphene and both single wall (SWNTs) and multiwall carbon nanotubes. (Itkis, Mikhail E., Ferenc Borondics, Aiping Yu, and Robert C. Haddon. "Bolometric infrared photoresponse of suspended single-walled carbon nanotube films." Science 312, no. 5772 (2006): 413-416. and Du, Xu, Ivan Skachko, Anthony Barker, and Eva Y. Andrei. "Approaching ballistic transport in suspended graphene." Nature nanotechnology 3, no. 8 (2008): 491-495.) Graphene possesses discrete absorption peaks that correspond to specific photon energies. For useful background material, refer to U.S. Pat. No. 6,400,088. As described, the absorption peaks of the graphene correlate directly to the diameter of the carbon nanotube.

Typical band-gaps for graphene range from 0.6-1.2 eV, where the band gap is proportional to the inverse thickness of the layer. These energies correlate to the graphene ability to detect radiation in the near IR range. Since graphene can also generate heat and phonons by several processes (injection of electrons, impinging with radiation, etc.), (Calizo, I., A. A. Balandin, W. Bao, F. Miao, and C. N. Lau. "Temperature dependence of the Raman spectra of graphene and graphene multilayers." Nano letters 7, no. 9 (2007): 2645-2649.) CNT fabric is also ideally suited as an IR detector.

Thermal infrared detectors, such as microbolometers, are a part of IR systems used to image heat emitted from natural phenomena. The current state of the art microbolometer utilizes vanadium oxide as the element which changes impedance for incoming IR radiation. Despite the improvements to the use and costs of IR focal plane arrays (IRFPAs), which are most sensitive in the LWIR (8-12 microns) and MWIR (3-5 microns), there seems to be a limit to sensitivity at 20 mk NEDT. (Purewal, Meninder S., Byung Hee Hong, Anirudhh Ravi, Bhupesh Chandra, James Hone, and Philip Kim. "Scaling of resistance and electron mean free path of single-walled carbon nanotubes." Physical review letters 98, no. 18 (2007): 186808.)

This performance is restricted by 1/f noise and the basic physical properties of the vanadium oxide (VOx) film. In addition, as the needs for increased sensitivity and smaller pixel size below 25 micron, silicon technology has run up against a sensitivity wall due to the scaling of 1/f noise as pixel size are reduced and the absolute noise floor is realized the basic properties of the silicon needs to be optimized for low noise operation.

One solution of the prior art is to use of carbon nanotubes to reduce noise, as described in U.S. Pat. No. 8,110,883, which includes the generations of excitons to produce heat in the IR sensing element to change the TCR response and thereby sensitivity. Carbon nanotubes also have high absorption coefficients of 104 to 10, which is higher than HgCdTe in the 8-12 micron region.

SUMMARY OF THE INVENTION

The present disclosure overcomes the problems of the prior art by making use of the inherent properties of aligned and unaligned carbon nanotubes, graphene layers alternated with silicon nitride thin films, which are transparent in the IR bands (1.5-12 microns) connected in series between the carbon nanotube and graphene films to enhance the NEDT and lower the noise floor to enable <1 mK NEDT.

Infrared (IR) radiation detecting and sensing systems using Si3N4 carbon nanotubes Graphene nanocomposites and methods to making the same. In certain embodiments of the invention, it includes, a thermally isolated microbolometric structure either using amorphous silicon or Vanadium Oxide IR radiation sensing elements. A layer of aligned or unaligned carbon nanotubes are applied, next a silicon nitride layers is deposited and graphene is deposited upon that surface. First and second conducting interconnects each in electrical communication with the nanotubes. The entire microbolometer structure is fabricated on a CMOS wafer with a readout design Percolation between the nanocomposite layers consisting of Vanadium oxide or amorphous silicon followed by aligned or nonaligned CNT layers, followed by silicon nitride layer and followed by a graphene layers deposited via chemical vapor deposition. Nanocomposites can be optimized for the IR detector application by modulating the densities of CNTs and graphene layers in the nanocomposite. The nanocomposite device is a microbolometer type where the ability to resolve smaller changes in temperature is highly desirable resulting in higher sensitivity IRFPAs Three different methods for constructing the detector proposed in this application include a combination of thin films where the interface between an existing V2O3 thin film on a suspended MEMS structure a silicon nanoparticle serves as the interface between the existing film and the aligned, random or bundled carbon nanotubes The second type is a CNT-Silicon nanocomposites mixed with an conjugated epoxy where the existing Silicon thin film is etched resulting in V-C bonding increasing electrical conduction, the third is to deposit a <10 A layer of various low Van Der Waals non-continuous thin films and attach a CNT-Silicon nanocomposites to the underlying Silicon thin film. The increase in temperature coefficient of resistance claimed within results in IR detectors capable of NEDT of less than 1 mK at low cost.

In one embodiment of the present invention an IR detector is described that increases the sensitivity from the current state of the art of 20 mK NEDT to <then 1 mK. This embodiment will enable applications of IR systems that were only met previously by cooled Mercury Cadmium Tellurium detectors. The detectors are an integral part of IR systems used to image heat emitted from natural phenomena. The present application uses a technique which senses change in resistance from the photon flux impinging on the detector. This type of detector is called a bolometer which uses metallic, semi metallic or semiconducting materials which has the inherent characteristic of a temperature coefficient of resistance (TCR). Amorphous Silicon or vanadium oxide is deposited on a cantilever beam which are fabricated on top of a CMOS wafer which contains readout circuitry. One of the advantages of this technology has been the fabrication compatibility with CMOS processing which has resulted in a use of wafer processing and thereby lower costs by increasing yields and realizing economies of scale of wafer level integration and processing.

These detectors are designed into IR focal plane arrays (IRFPAs) which are most sensitive in the LWIR (8-12 microns) and MWIR (3-5 microns). The HgCdTe technology which was cooled to 77K for optimal operation used mechanical coolers which limited application to IR systems because of weight, size and cost.

Despite the improvements the current state of the art amorphous silicon and vanadium oxide technology has brought to the use and costs of IRFPAs, there seems to be a limits to sensitivity ~20 mK NETD. In addition as the needs for increased sensitivity and smaller pixel size below 25 micron State of the art technology has run up against a sensitivity wall due to the scaling of 1/f noise as pixel size are reduced and the absolute noise floor is realized the basic properties of the bolometers needs to be optimized for low noise operation.

Another enhancement is discussed within this patent application, the use of graphene deposited by chemical vapor deposition which provides more optical electrical and thermal conductivity on top of the existing Silicon film which will result in a wider range in sensitivity and combining the carbon nanotubes films with a graphene in a nanocomposite resulting in increased sensitivity.

BRIEF DESCRIPTION OF THE DRAWINGS

The invention description below refers to the accompanying drawings, of which.

DETAILED DESCRIPTION

The present application includes a carbon nanotube (CNT)-$Si_3N_4$-graphene nanocomposite that can be disposed atop a vanadium oxide or amorphous silicon-based IR detector of a microbolometer, thereby providing enhanced IR detection of the microbolometer. Herein, it is to be noted that the thermal IR detector may be referred to as a nanocomposite microbolometer.

Figure 1:
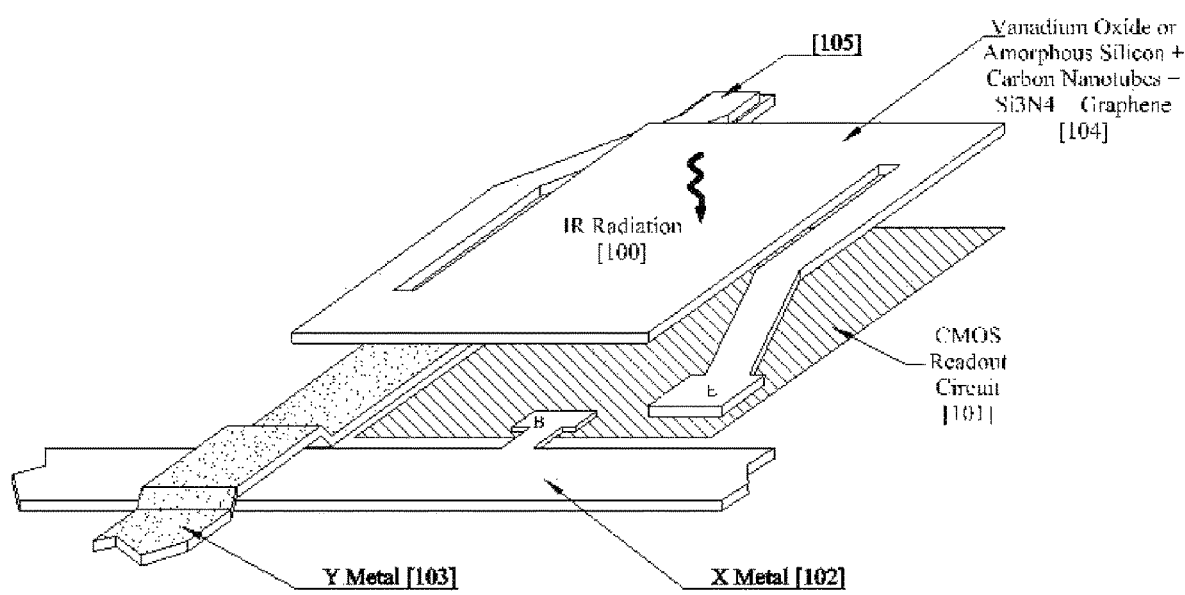
FIG. 1 depicts an overall structure of a microbolometer according to one or more aspects of the disclosure.

FIG. 1 depicts an overall structure of detector of a microbolometer. The structure depicted in FIG. 1 can represent a single detector (e.g., pixel) of an overall microbolometer structure, which can comprise an N×M array of thermally isolated detectors. As shown, electromagnetic (e.g., infrared) radiation 100 is at least partially or completely absorbed by the detector 104. In one example, the detector 104 is a $Si^3N^4$-CNT-graphene nanocomposite disposed on a vanadium oxide or amorphous silicon IR detector, which will be described in greater detail below Detector 104 is shown as being cantilevered by a pair of support legs 105 over and with respect to CMOS readout circuit 101, which is itself disposed on a silicon substrate. This configuration allows for a gap or cavity between the detector 104 and the CMOS readout circuit 101 thereby providing thermal isolation of the detector 104 from the CMOS readout circuit 101. The microbolometer can also include X metal 102 and Y metal 103, which can connect to other detectors in the overall microbolometer array to allow for readout and processing of columns and rows of detected signals. The substrate can have an insulating layer comprised of dielectric material with a cantilever beam composed of silicon nitride, which is suspended over a channel, thereby providing thermal isolation from surrounding environments.

Figure 2:
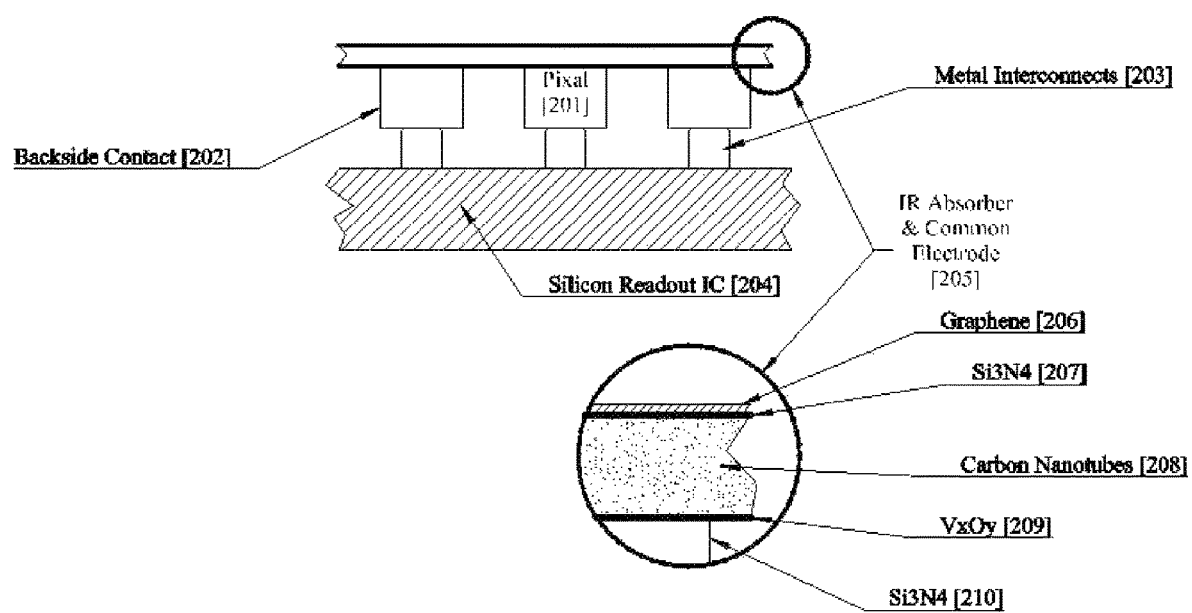
FIG. 2 depicts a cross section of nanocomposite IR detector array with integrated readout integrated circuit according to one or more aspects of the disclosure.

FIG. 2 depicts a cross section of a nanocomposite IR detector array with integrated readout integrated circuit. As shown, the array can include one or more detectors 201 (e.g., pixels) that can form the detector array. Each detector 201 can be associated with a backside contact 202 and a metal interconnect 203, which connects the nanocomposite detector and common electrode 205 to the silicon substrate containing CMOS readout circuitry 204. The nanocomposite detector can be positioned on a cantilevered $Si_3N_4$ beam 210. Atop and immediately adjacent to the $Si_3N_4$ beam 210 can be a vanadium oxide ($V_xO_y$) layer 209. In another example of the present disclosure, layer 209 can include amorphous silicon. In either example, layer 209 is suspended over the silicon substrate containing CMOS circuitry and is disposed between electrical contacts. Atop and immediately adjacent to the layer 209 can be a layer 208 of carbon nanotubes (CNT), which can be aligned, partially aligned, or unaligned Atop and immediately adjacent to the layer 208 can be a layer 207 of Si3N4. Atop and immediately adjacent the layer 207 can be a one or more monolayers of graphene 206. In one example, the number of monolayers can be in the range of one to ten monolayers of graphene.

Figure 3B:
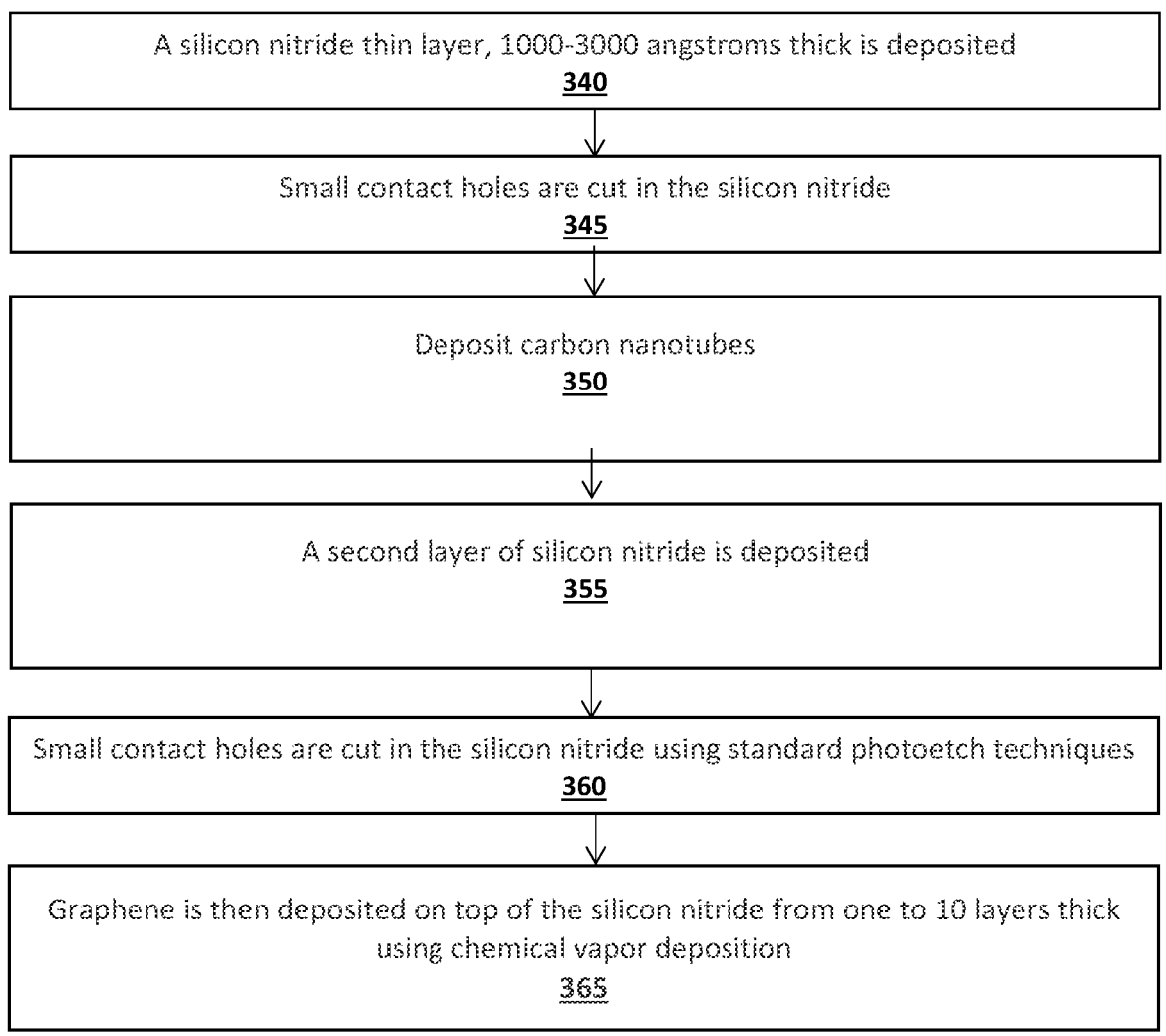
FIG. 3A-3 is a flow chart depicting fabrication of a microbolometer structure according to one or more aspects of the disclosure.
Figure 4:
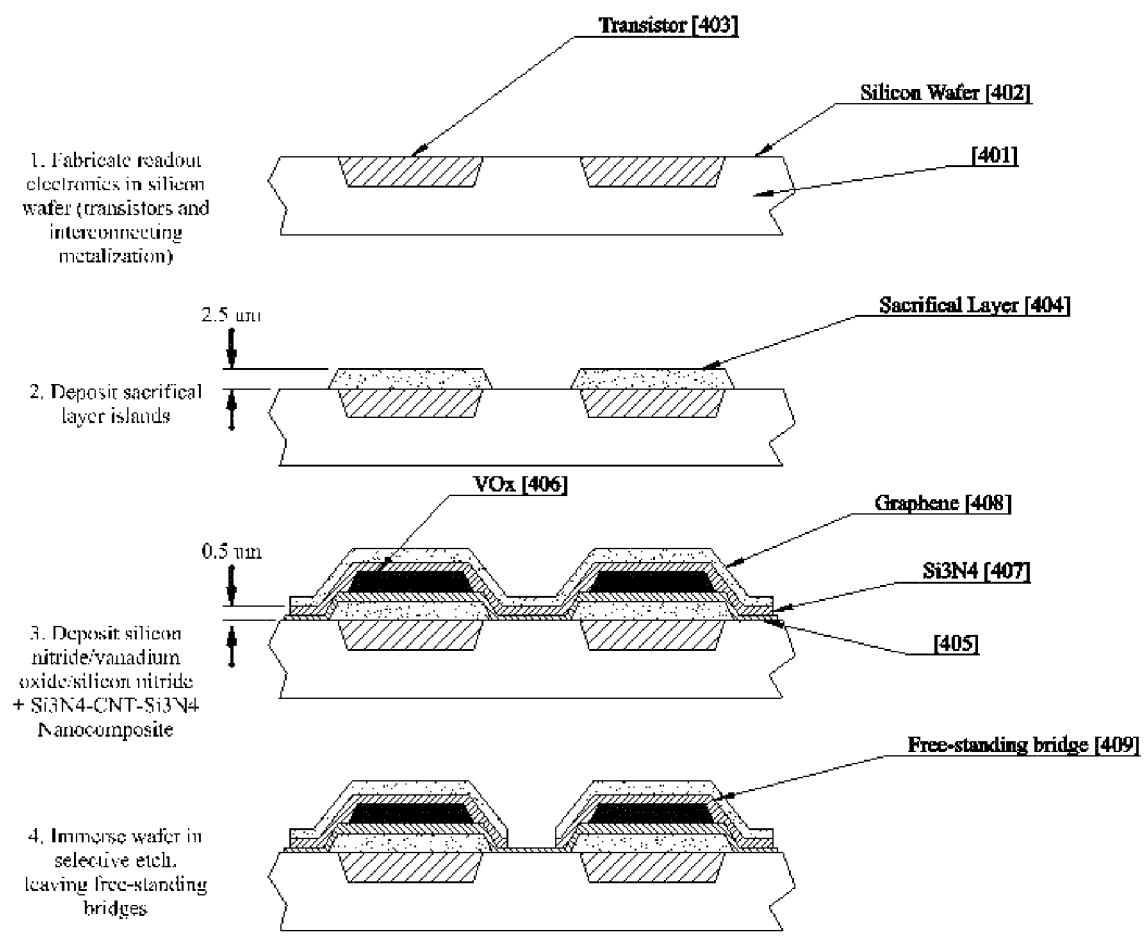
FIG. 4 depicts a plurality of stages of manufacture of a microbolometer structure according to one or more aspects of the disclosure.

FIGS. 3A-B are flow charts depicting a method of manufacturing a microbolometer with a CNT-Si3N4-graphene nanocomposite. FIG. 4 depicts a cross section of the microbolometer structure during various stages of manufacture.

Due to the mechanical properties of the microbolometer structure and in order not to modify the underlying CMOS circuit performance, each of the blocks and stages depicted in FIGS. 3A-13 and 4 are conducted at less than 150 degrees Celsius and do not use etch chemistries that are incompatible with the underlying structure.

At block 305, a layer of SiO2 is deposited on a substrate 401. The silicon oxide film can be deposited using standard CMOS microelectronics processing techniques.

In one example, the substrate can include one or more tungsten plugs. In this regard, the one or more tungsten plugs are provided in the substrate and disposed below the silicon oxide film.

One or more via holes are photolithographically delineated allowing for electrical contact to the underlying CMOS circuitry. In one example, the one or more via holes correspond to the locations of the one or more tungsten plugs.

At block 310, a reflection layer is deposited composed of either copper or gold, which is delineated into a square which will define the ultimate detector cavity. In the example of copper, the thin film of copper is deposited using one of electron bean evaporation and direct current sputtering to create a IR reflective mirror in the bottom of the well.

At block 315, a layer of sacrificial material such as polyimide of amorphous silicon or vanadium oxide is deposited and delineated using deposition and photo etch techniques. The layer of amorphous silicon or vanadium oxide can be planarized. Contact holes can be etched through the amorphous silicon to clear the amorphous silicon layer and the copper film layer down to a tungsten plug disposed in the substrate. CMOS interconnect thin films can be deposited in the hole above the tungsten plug to delineate interconnect structures using standard photolithographic and dry etch techniques.

At block 320, a thin films of $Si_3N_4$ and $SiO_2$, as shown at elements 405 and 407, are deposited on top of the sacrificial layer.

At block 325, deposit using ion assisted deposition technique of chemical vapor deposition a thin film of amorphous silicon or ion beam deposition of vanadium oxide.

At block 330, thin films of SiO2, gold black (e.g., a composite of Au with graphite on top) and Si3N4 are deposited. The purpose of all three films is to minimize reflections and to provide mechanical structure of the microbolometer structure.

At block 335, the sacrificial layer 404 is etched to create the detector cavity and to etch through the three thin films 404, 405, and 407 to expose the amorphous silicon or vanadium oxide 406 layer using photolithographic/etch techniques. Etching the cavity in the amorphous silicon layer to thereby create a gap. This gap creates thermal isolation from the surrounding structure, thereby fabricating the IR detector. The cavity in the amorphous silicon can be etched using Xenon difluoride ($XeF_2$) etching techniques.

After block 335, a microbolometer structure is formed comprising a heat sensing amorphous silicon layer that is the top layer of the microbolometer detector structure. In another example, the nanocomposite detector comprises a heat sensing vanadium oxide layer that is the top layer of the microbolometer detector structure.

At block 340, a silicon nitride thin layer, 1000-3000 angstroms thick is deposited on the amorphous silicon or vanadium oxide layer.

At block 345, small contact holes are cut in the silicon nitride using standard photoetch techniques.

At block 350, random, aligned, or partially aligned carbon nanotubes are deposited on top the silicon nitride. In this example, the carbon nanotube solution with the dispensing solution is deposited on a wafer using centrifugal force. In the case of the partially aligned or aligned CNT-nanoparticle solution a high voltage field is applied to case the CNTs to partially align or align. The random aligned CNT case is deposited with only centrifugal force determining the composition of the CNT matrix. Aligning or partially aligning the film is accomplished by using a high voltage field (50-100V) to orient the CNT film.

The thin film of bundled carbon nanotubes is tuned to be sensitive to IR radiation in the micron band of 2 to 12 microns and the exposure of IR radiation induces a change in impedance between the first and second conductive terminals which is sensed by CMOS readout circuitry.

In one example, deposition of the aligned, partially aligned or non-aligned carbon nanotube film via a horizontal orientation using one of a spin on process using centrifugal forces or a spray on technique. The CNT film is then etched in a Hydrogen or Chlorine discharge inducing defects in the carbon-carbon bonds causing dangling bonds which will serve as bonding sites for the CNT-graphene (or Si nanoparticles) bonding interconnects through the vias etched in the silicon nitride.

In one example, carbon nanotubes and Silicon nanoparticles are mixed in a concentration of 01 to 10 percent by volume in a conjugated polymer or epoxy and then apply to the surface of the existing vanadium oxide thin film. The modulation of CNT/Silicon nanoparticle concentration will result in increased percolation and thermal conductivity resulting in the capability to tune the temperature coefficient of resistance The CNT film can be composed of single wall carbon nanotubes having diameters corresponding to a tuned IR response wavelength or can be composed of multi wall carbon nanotubes having diameters corresponding to a tuned IR response wavelength. In still another example, the CNT film can be composed of single wall carbon nanotubes and multi wall carbon nanotubes having diameters corresponding to a tuned IR responsive wavelength The thin film of aligned or unaligned carbon nanotubes is tuned to increase sensitivity of the IR detector by increasing the density of the bundled carbon nanotubes, which thereby increases the temperature coefficient of resistance (TCR) to excess of 10% per degree centigrade, thereby resulting in a Noise Equivalent Delta Temperature (NEDT) of less than 1 mK.

The thin film of Silicon nanoparticles-CNT nanocomposite is tuned to be sensitive to IR radiation in the micron band of 1 to 12 microns and the exposure of IR radiation induces a change in impedance between the first and second conductive terminals which is sensed by CMOS readout circuitry; which thereby increases the TCR to an excess of 6% per degree centigrade.

The CNT can be aligned in bundles by one of: use of electromagnetic field to align the carbon tubes, use of nanogroves sprayed with a hydrophobic compound which aligns the nanotubes, or through modification of surfactant in an aqueous solution of nanotubes to maximize nanotube clumping. In one example, the hydrophobic compound comprises one of saline and a derivative thereof, including aminopropyltriethoxysilane. The bundled carbon nanotube fabric will ultimately be suspended above the substrate, thereby fabricating the IR detector; wherein the thin film of bundled carbon nanotubes is tuned to be sensitive to IR radiation in the micron band of 1 to 12 microns and the exposure of IR radiation induces a change in impedance between the first and second conductive terminals which is sensed by CMOS readout circuitry At block 355, a second layer of silicon nitride is deposited [705] with thicknesses of 1000-3000 angstrom. The next process step is to deposit silicon nitride using a variant of chemical vapor deposition [705]. This thickness is from 1000 to 3000 angstroms [701,705]

At block 360, small contact holes are cut in the silicon nitride using standard photoetch techniques. Contact holes are delineated in both silicon nitride layers to enable contact between the carbon nanotube and graphene layers.

At block 365, graphene [706] is then deposited on top of the silicon nitride from one to 10 layers thick using chemical vapor deposition One to ten monolayers of graphene is deposited using chemical vapor deposition at less than 150 degrees centigrade [408,708]. The whole structure is annealed at 150 degrees centigrade to promote chemical bonding.

These two examples described above are designed to be compatible and able to be integrated with the underlying microbolometer process flow in terms of temperature and chemical compatibility. Starting with a CMOS wafer [101, 202] with a design for a readout circuit as described in FIG. 5, the microbolometer is fabricated on top of this CMOS circuit. The process flow has been designed to meet these process integration requirements mainly thermal compatibility with the underlying CMOS circuitry [101,601-608]. No process temperature can be in greater than 150 degrees centigrade.

Figure 5:
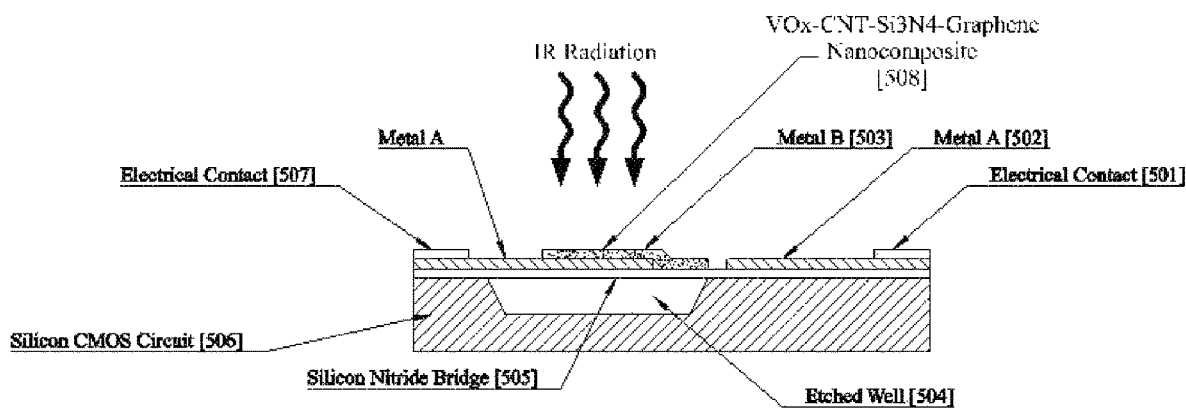
FIG. 5 depicts a cross section of a microbolometer having a nanocomposite detector according to one or more aspects of the disclosure.

FIG. 5 depicts the thermal operation of the device. The thermal operation of this device is suspended cantilever beam with either amorphous silicon or vanadium oxide with the Si3N4-carbon nanotube composite-Si3N4-graphene sensing element [501] suspended over a well. [504] This structure is fabricated on top of the CMOS circuitry used for readout. [506] The suspension of the structure over the well provides thermal isolation from the surrounding structure. The interconnect [501,503,507] widths are minimized and use highly resistive metal to provide thermal isolation from the surrounding environment.

Figure 6:
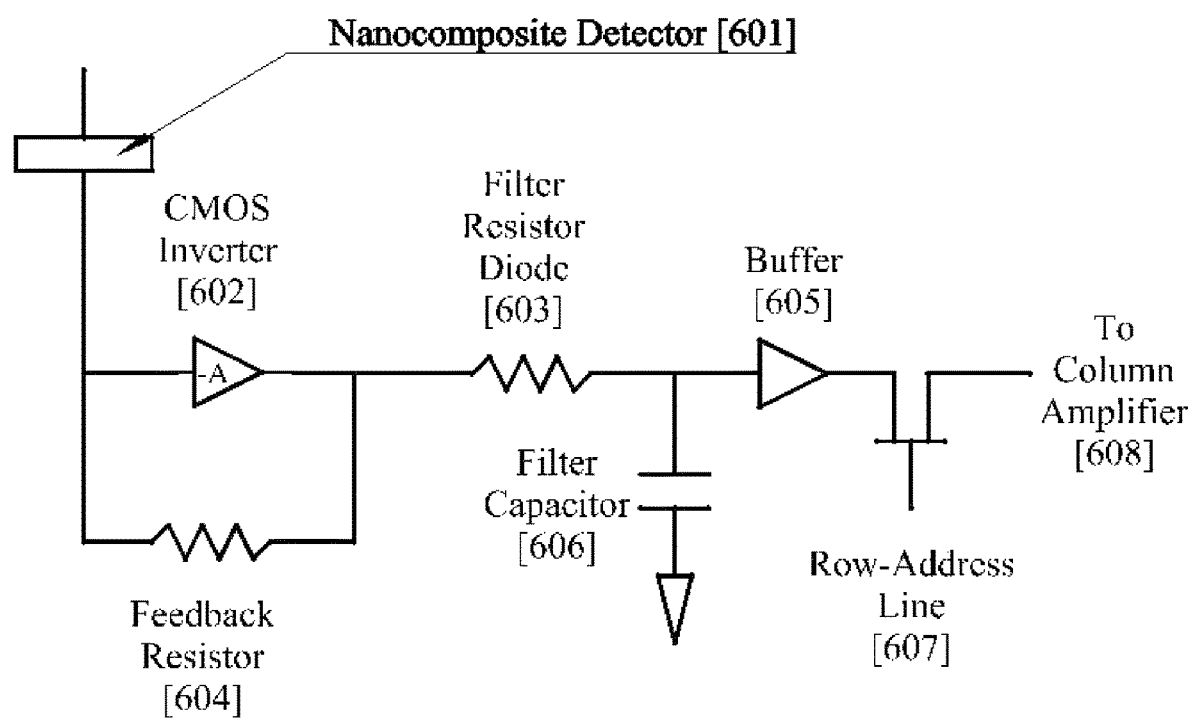
FIG. 6 depicts a circuit diagram of a readout circuit for use with a microbolometer structure according to one or more aspects of the disclosure.

FIG. 6 depicts a circuit diagram of a readout circuit for use with any of the microbolometer structures of the present application. The readout circuit can sense changes in input impedance of the nanocomposite detector. As shown, the nanocomposite detector 601 can provide a signal to a CMOS inventor 602 which is provided in parallel with a feedback resistor. The inverter 602 and resistor 604 are connected to a filter resistor diode 603, which is connected to a filter capacitor 606 and a buffer 605. The buffer can then provide a signal to row address line 607 and column amplifier 608. sensing circuitry for detecting changes in input impedance using the CMOS readout circuitry.

Figure 7:
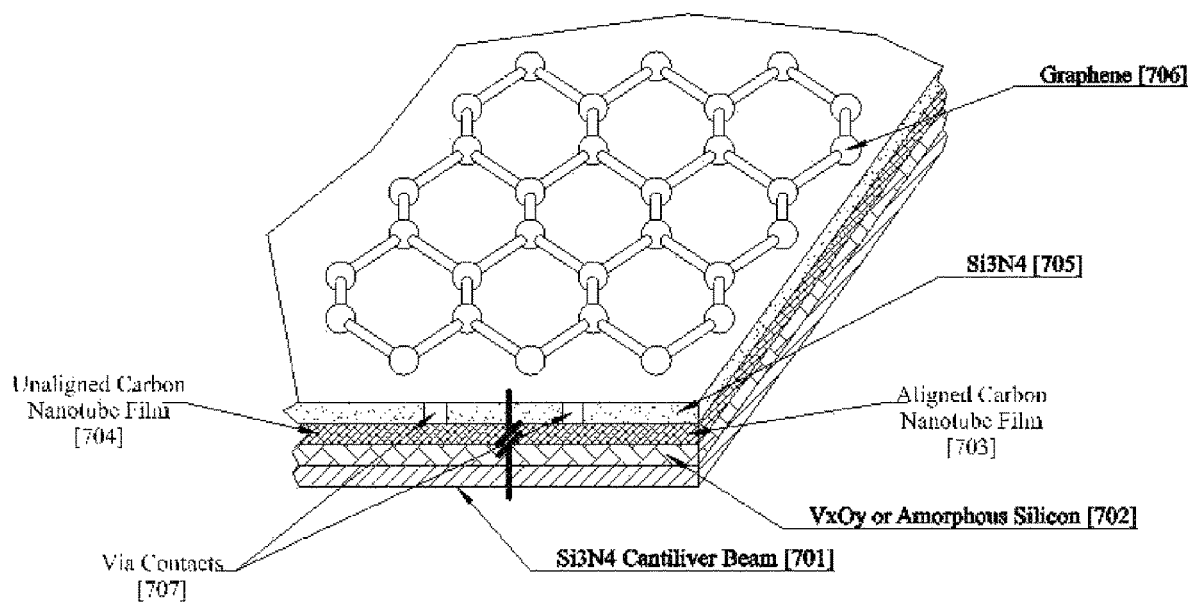
FIG. 7 is a perspective cross section view of a nanocomposite detector structure according to one or more aspects of the disclosure.

FIG. 7 is a perspective cross section view of a nanocomposite detector structure according to one or more aspects of the disclosure.

As shown, the nanocomposite detector can include an Si3N4 cantilever beam 701.

The nanocomposite detector can include, a layer 702 of vanadium oxide or amorphous silicon disposed atop the Si3N4 cantilever beam.

The nanocomposite detector can include a layer of CNT 703, 704 disposed atop the vanadium oxide or amorphous silicon. As discussed above, the CNT can be unaligned, partially aligned, or completely aligned.

The nanocomposite detector can include a layer 705 of Si3N4 disposed atop the CNT film 703, 704.

The nanocomposite detector can include a layer of graphene 706 disposed atop the Si3N4. Via holes 707 can be formed to allow for electrical communication of the graphene layer and the CNT layers.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A nanocomposite detector structure, comprising:
   a $Si_3N_4$ cantilever beam;
   a layer of vanadium oxide or amorphous silicon disposed atop the $Si_3N_4$ cantilever beam;
   a carbon nanotube (CNT) film disposed atop the layer of vanadium oxide or amorphous silicon;
   a layer of $Si_3N_4$ disposed atop the CNT film; and
   a layer of graphene disposed atop the layer of $Si_3N_4$.

2. The nanocomposite detector structure of claim 1, wherein the CNT film comprises carbon nanotubes that are at least one of aligned, partially aligned, or unaligned.

3. The nanocomposite detector structure of claim 1, wherein the CNT film further comprises silicon nanoparticles in a concentration of 0.01 to 10 percent by volume.

4. The nanocomposite detector structure of claim 1, wherein the CNT film comprises single wall carbon nanotubes having diameters corresponding to a tuned IR response wavelength.

5. The nanocomposite detector structure of claim 1, wherein the CNT film comprises multi wall carbon nanotubes having diameters corresponding to a tuned IR response wavelength.

6. The nanocomposite detector structure of claim 1, wherein the CNT film comprises single wall carbon nanotubes and multi wall carbon nanotubes having diameters corresponding to a tuned IR responsive wavelength.

* * * * *